US008347117B2

(12) United States Patent  (10) Patent No.: US 8,347,117 B2
Tokita  (45) Date of Patent: Jan. 1, 2013

(54) ELECTRONIC APPARATUS AND METHOD FOR PREVENTING UNAUTHORIZED ACCESS TO AN ELECTRONIC APPARATUS

(75) Inventor: Shinobu Tokita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 985 days.

(21) Appl. No.: 12/076,264

(22) Filed: Mar. 14, 2008

(65) Prior Publication Data
US 2008/0229432 A1 Sep. 18, 2008

(30) Foreign Application Priority Data

Mar. 15, 2007 (JP) ................................ 2007-066681

(51) Int. Cl.
G06F 1/00 (2006.01)
G06F 1/26 (2006.01)
(52) U.S. Cl. ........... 713/300; 713/324; 713/340; 726/34
(58) Field of Classification Search .................... 726/17, 726/34; 713/300, 324, 340
See application file for complete search history.

(56) References Cited

U.S. PATENT DOCUMENTS

| 5,960,084 A * | 9/1999 | Angelo ........................ 713/185 |
| 7,613,446 B2 * | 11/2009 | Engstrom et al. ............. 455/411 |
| 7,752,460 B2 * | 7/2010 | Shibuya et al. ............... 713/193 |
| 2002/0009185 A1 * | 1/2002 | Tung ........................ 379/142.01 |
| 2005/0082310 A1 * | 4/2005 | Schwarzli ..................... 221/154 |
| 2005/0182971 A1 * | 8/2005 | Ong et al. ...................... 713/202 |
| 2005/0198185 A1 * | 9/2005 | Yamaoka et al. ............. 709/208 |
| 2006/0117198 A1 * | 6/2006 | Takasu .......................... 713/323 |
| 2006/0119315 A1 * | 6/2006 | Sasaki et al. .................. 320/106 |
| 2006/0223500 A1 * | 10/2006 | Osugi et al. .................... 455/411 |
| 2007/0271383 A1 * | 11/2007 | Kim et al. ..................... 709/227 |

FOREIGN PATENT DOCUMENTS

| JP | 6-75652 | 3/1994 |
| JP | 2004-140548 | 5/2004 |
| JP | 2004-259000 | 9/2004 |
| JP | 2005322106 A | * 11/2005 |

OTHER PUBLICATIONS

Japanese Notification of Reason(s) for Refusal dated Feb. 7, 2012 issued in corresponding Japanese Patent Application No. 2007-066681.

* cited by examiner

*Primary Examiner* — Mohammad W Reza
(74) *Attorney, Agent, or Firm* — Staas & Halsey LLP

(57) ABSTRACT

According to an aspect of an embodiment, an electronic apparatus comprises: an electronic apparatus powered by one of a plurality of electric power sources, comprising: a power supply unit for providing the interior of the electronic apparatus with the electric power from one of the electric power sources alternatively; and a controller for requesting user authentication when supply of the electric power to the interior of the electric apparatus is switched from one of the power sources to another.

10 Claims, 5 Drawing Sheets

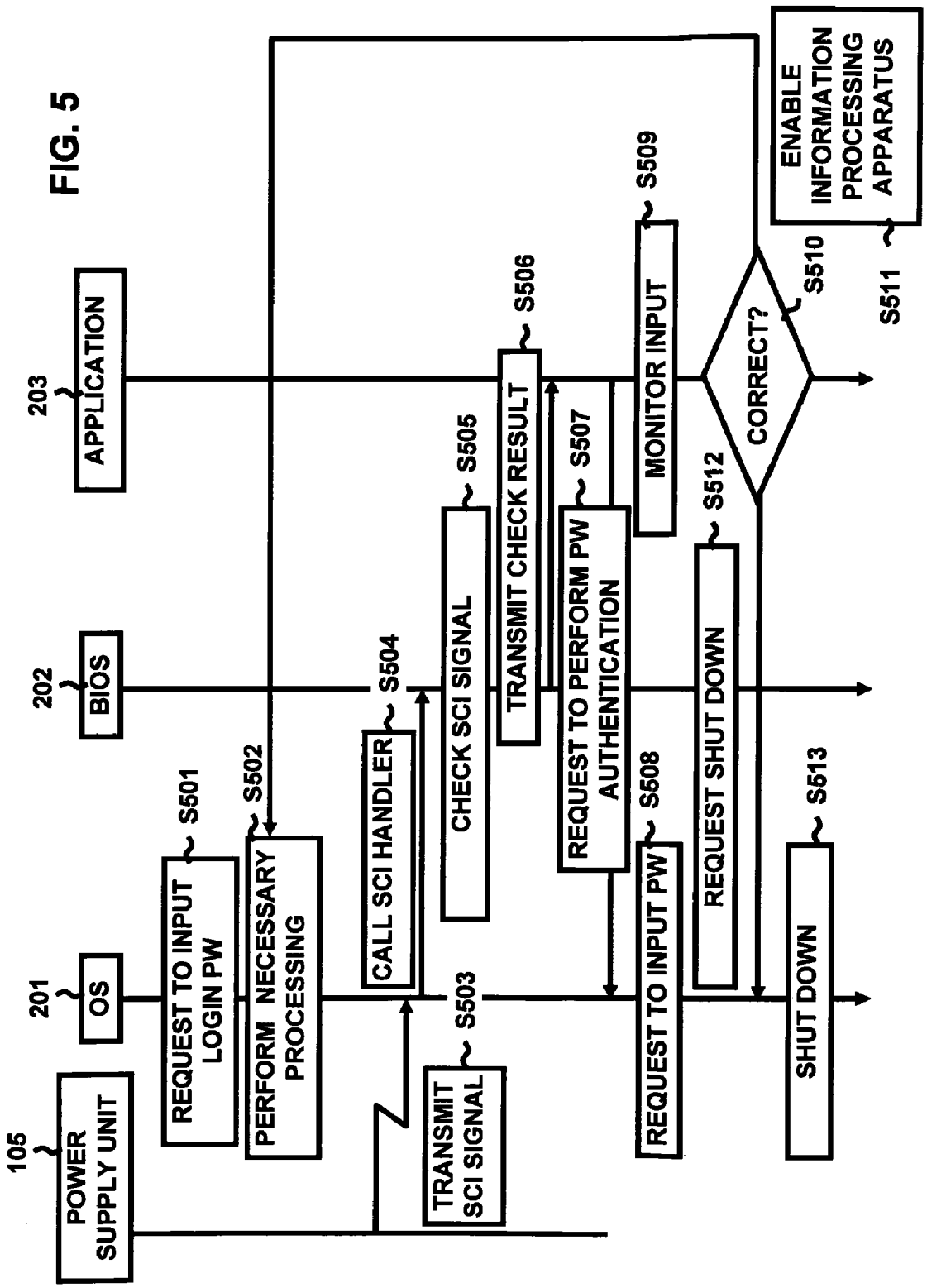

ELECTRONIC APPARATUS AND METHOD FOR PREVENTING UNAUTHORIZED ACCESS TO AN ELECTRONIC APPARATUS

BACKGROUND OF THE INVENTION

1. Field of the Invention

This art relates to an information processing apparatus for preventing unauthorized access to information stored in the information processing apparatus.

2. Description of the Related Art

In many electronic apparatuses such as PCs, in order to improve a security level, password authentication can be performed when they are started.

In such electronic apparatuses, if a password entered by a user does not match a registered password, the user cannot log in the OS of the electronic apparatus's and refer to data stored in the electronic apparatus.

However, if an electronic apparatus is stolen after a user has logged in the OS of the electronic apparatus using a password, data stored in the electronic apparatus can also be stolen. Thus, the protection of data stored in an electronic apparatus cannot be achieved.

An electronic apparatus for preventing unauthorized access, for example, is disclosed in Japanese Laid-open Patent Publication No. 2004-140548.

SUMMARY

According to an aspect of an embodiment, an electronic apparatus comprises: an electronic apparatus powered by one of a plurality of electric power sources, comprising: a power supply unit for providing the interior of the electronic apparatus with the electric power from one of the electric power sources alternatively; and a controller for requesting user authentication when supply of the electric power to the interior of the electric apparatus is switched from one of the power sources to another.

BRIEF DESCRIPTION OF THE DRAWINGS

FIG. 5 is a flowchart illustrating a password request process according to an embodiment of the present invention.

DESCRIPTION OF THE PREFERRED EMBODIMENTS

First Embodiment

In this embodiment, in an information processing apparatus 100, password authentication is performed when an AC adapter 122 is disconnected from a power supply unit 105.

Figure 1:
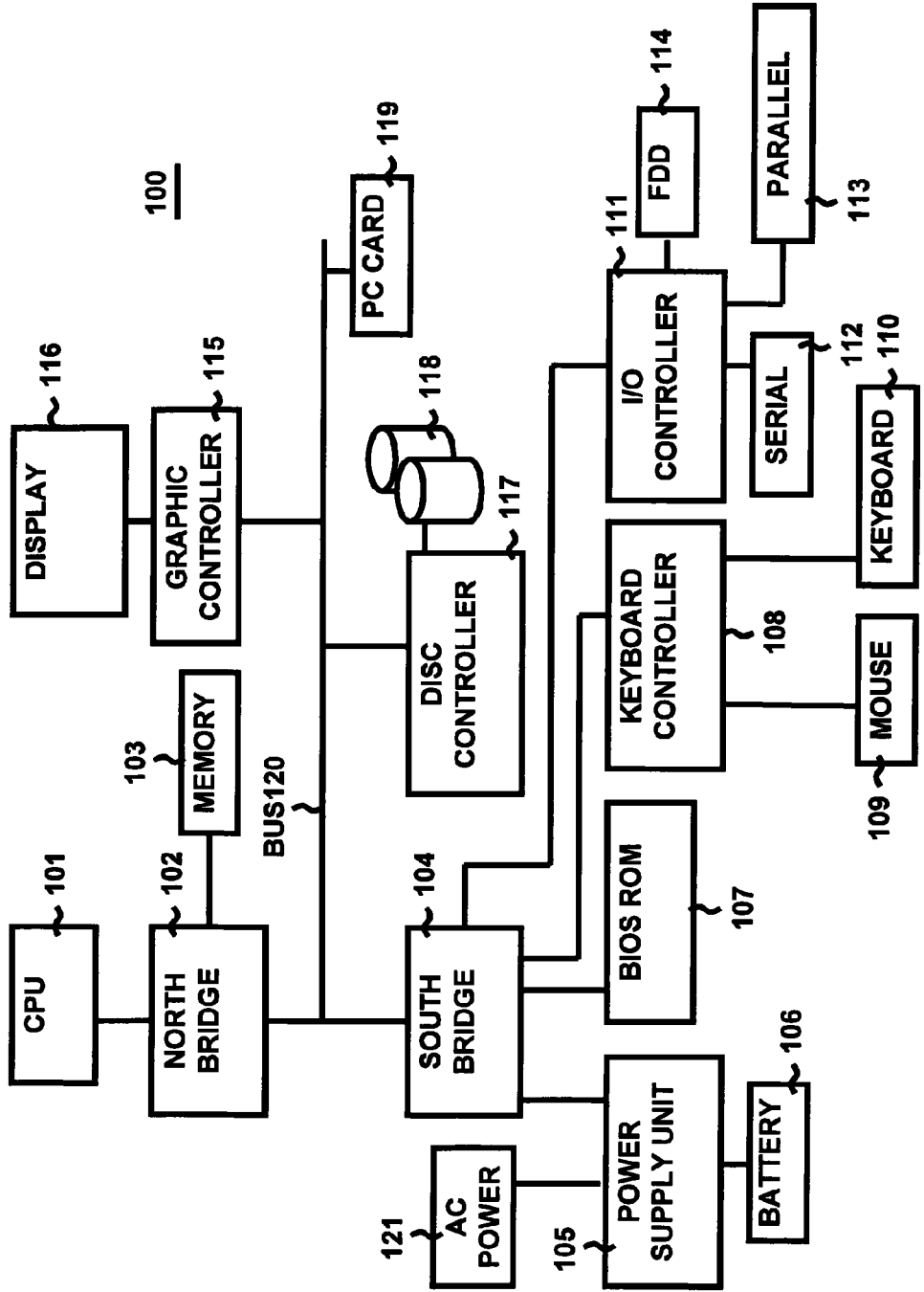
FIG. 1 is a block diagram illustrating a hardware configuration of an information processing apparatus according to an embodiment of the present invention.

FIG. 1 is a block diagram illustrating a hardware configuration of the information processing apparatus 100 according to an embodiment of the present invention.

The information processing apparatus 100 is, for example, a notebook-sized personal computer capable of obtaining power from a plurality of power sources such as a battery and an AC power supply.

The information processing apparatus 100 includes a CPU (central processing unit) 101, a north bridge 102, a memory 103, a south bridge 104, the power supply unit 105, a battery 106, a BIOS ROM 107, a keyboard controller 108, a mouse 109, a keyboard 110, an I/O controller 111, a serial port 112, a parallel port 113, an FDD (Floppy Disk Drive) 114, a graphic controller 115, a display 116, a disk controller 117, a hard disk 118, a PC card 119, and a bus 120.

The north bridge 102 is an LSI chip set that controls information distribution of the information processing apparatus 100 and connects the CPU 101 and the memory 103 to the bus 120. The south bridge 104 is also an LSI chip set that controls information distribution of the information processing apparatus 100 and connects the power supply unit 105, the BIOS ROM 107, the keyboard controller 108, and the I/O controller 111 to the bus 120.

The BIOS ROM 107 is a storage unit for storing a BIOS (Basic Input/Output System). The keyboard controller 108 controls the mouse 109 and the keyboard 110. The I/O controller 111 controls the serial port 112, the parallel port 113, and the FDD 114. The graphic controller 115 controls the display 116. The disk controller 117 controls the hard disk 118. The BIOS ROM 107 stores a BIOS that is a set of programs executed in the power supply unit 105, the keyboard controller 108, the I/O controller 111, and the graphic controller 115 which are connected to the information processing apparatus 100. The bus 120 is, for example, a PCI (Peripheral Component Interconnect) bus or a PCI Express bus used for data transfer in the information processing apparatus 100. The hard disk 118 stores an OS (Operating System), a driver, and user data.

The power supply unit 105 controls the switching of a power source between an AC power supply 121 and the battery 106, and transmits to the OS an SCI (System Control Interrupt) signal representing that a power source (the AC power supply 121 or the battery 106) has been changed. The CPU 101 loads the OS, which is stored in the hard disk 118, into the memory 103 as appropriate so as to control the information processing apparatus 100.

Figure 2:
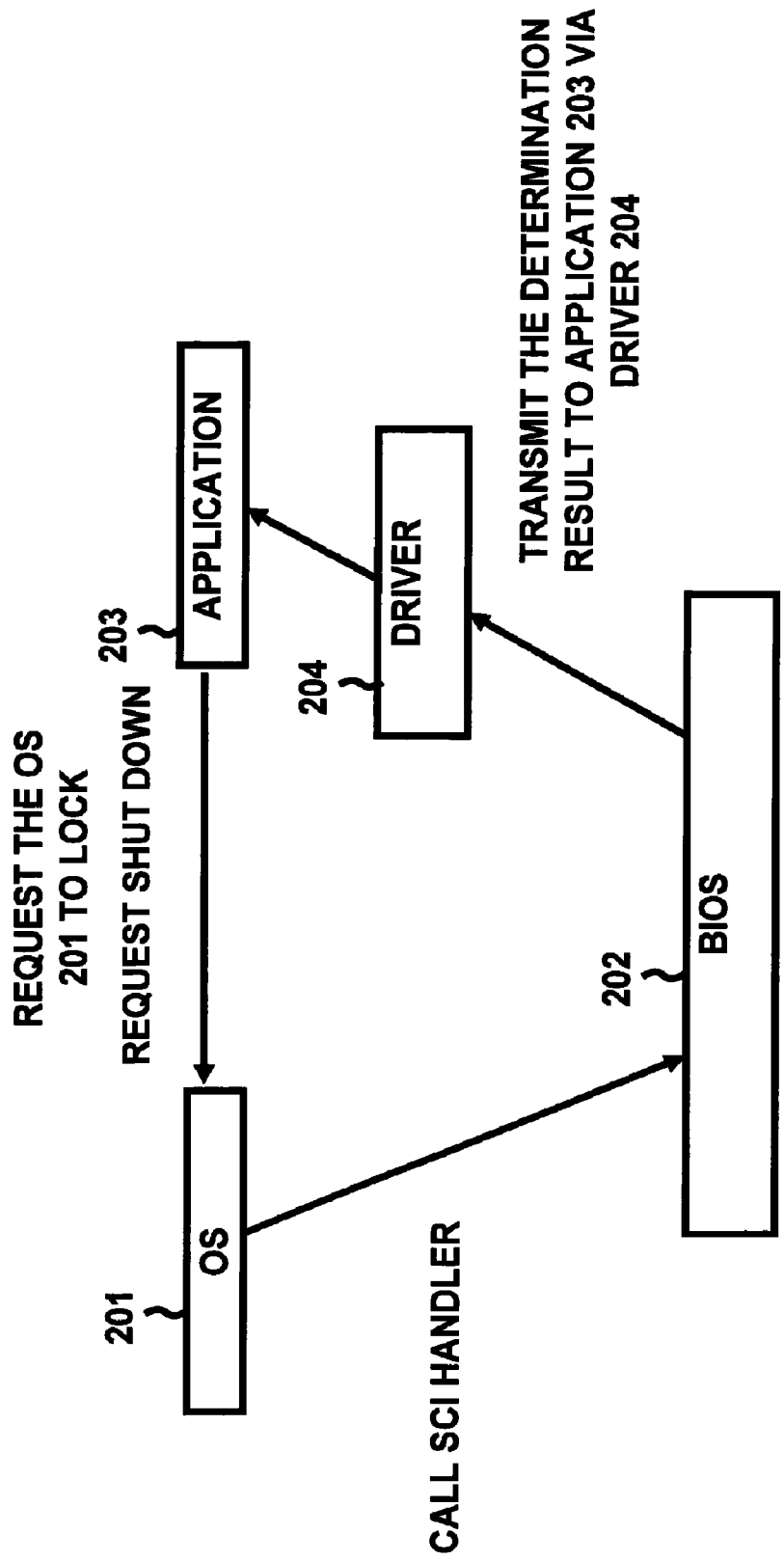
FIG. 2 is a diagram illustrating a software configuration of an information processing apparatus according to an embodiment of the present invention.

FIG. 2 is a diagram illustrating a software configuration of an information processing apparatus according to an embodiment of the present invention.

Upon detecting an SCI signal generated by the power supply unit 105, an OS 201 requests a BIOS 202 to call an SCI handler. The SCI signal is an interrupt request signal and is transmitted to the OS 201 so as to interrupt processing performed by the OS 201. The power supply unit 105 generates the SCI signal, which is an interrupt request signal, when the state of a connection between the AC adapter 122 and the power supply unit 105 is changed, and transmits the generated SCI signal to the south bridge 104. The OS 201 detects the SCI signal and calls the SCI handler that is one of components included in the BIOS 202. At that time, the OS 201 monitors the state (on/off) of a flag representing whether the south bridge 104 has received the SCI signal. The south bridge 104 has a status register 400 denoting the relationship between an SCI signal 401 and a flag 402. The flag 402 is set to on when the south bridge 104 has received the SCI signal 401, and is set to off when the south bridge 104 has not received the SCI signal 401.

The SCI handler determines which one of two types of SCI signals, that is, a signal representing that the AC adapter 122 has been disconnected from the power supply unit 105 and a signal representing that the AC adapter 122 has been connected to the power supply unit 105, has been received, and transmits the determination result to an application 203 via a driver 204.

The application 203 requests the OS 201 to lock the information processing apparatus 100 and perform password authentication. If an incorrect password is input, the application 203 requests the OS 201 to shut down the information processing apparatus. The information processing apparatus 100 according to this embodiment is compliant with the ACPI (Advanced Configuration and Power Interface) standard that allows the OS 201 to set and manage the power control function of each unit. As a matter of course, the information processing apparatus 100 may be compliant with another power control standard.

Figure 3:
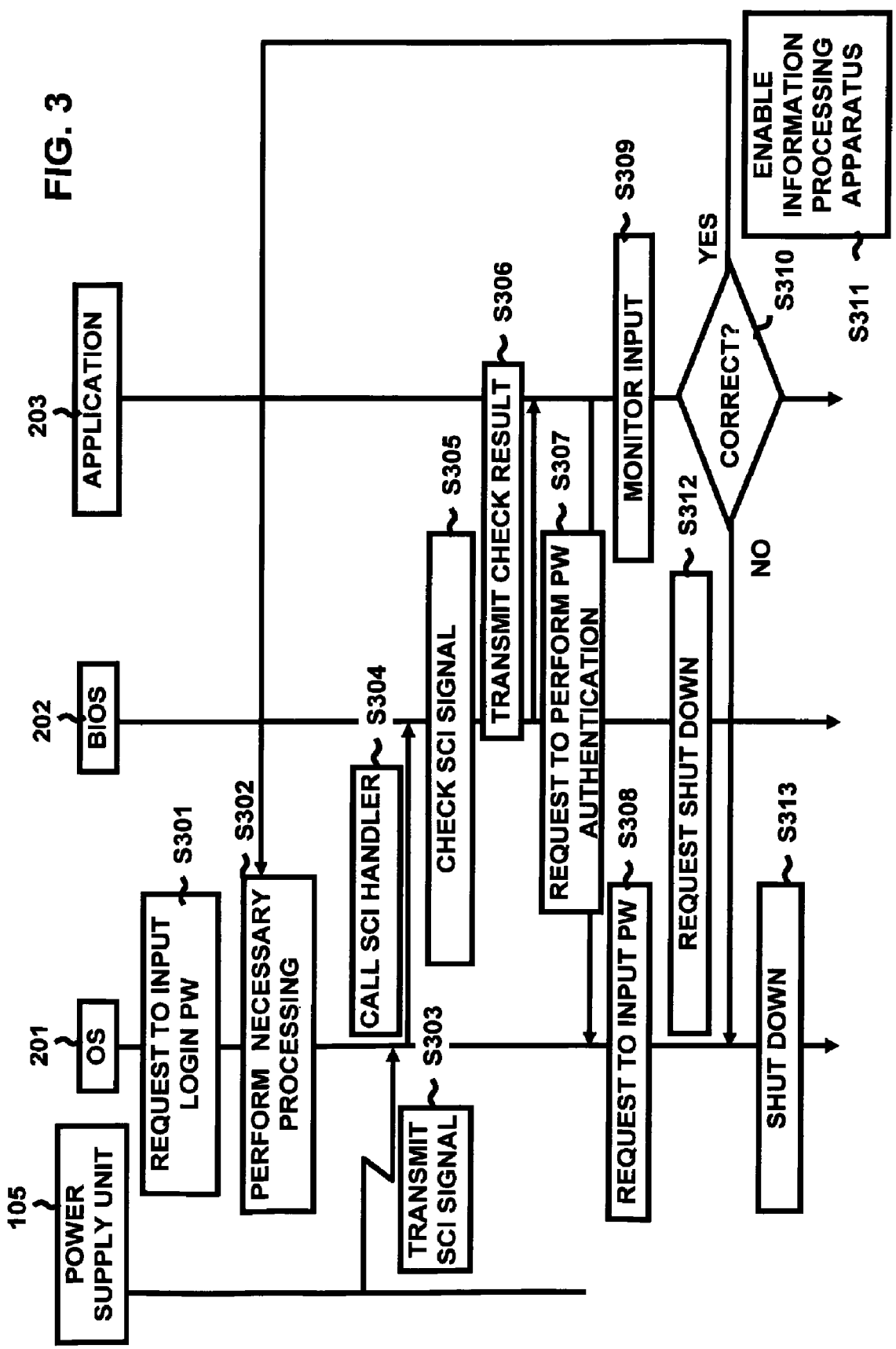
FIG. 3 is a flowchart illustrating a password request process according to an embodiment of the present invention.
Figure 4:
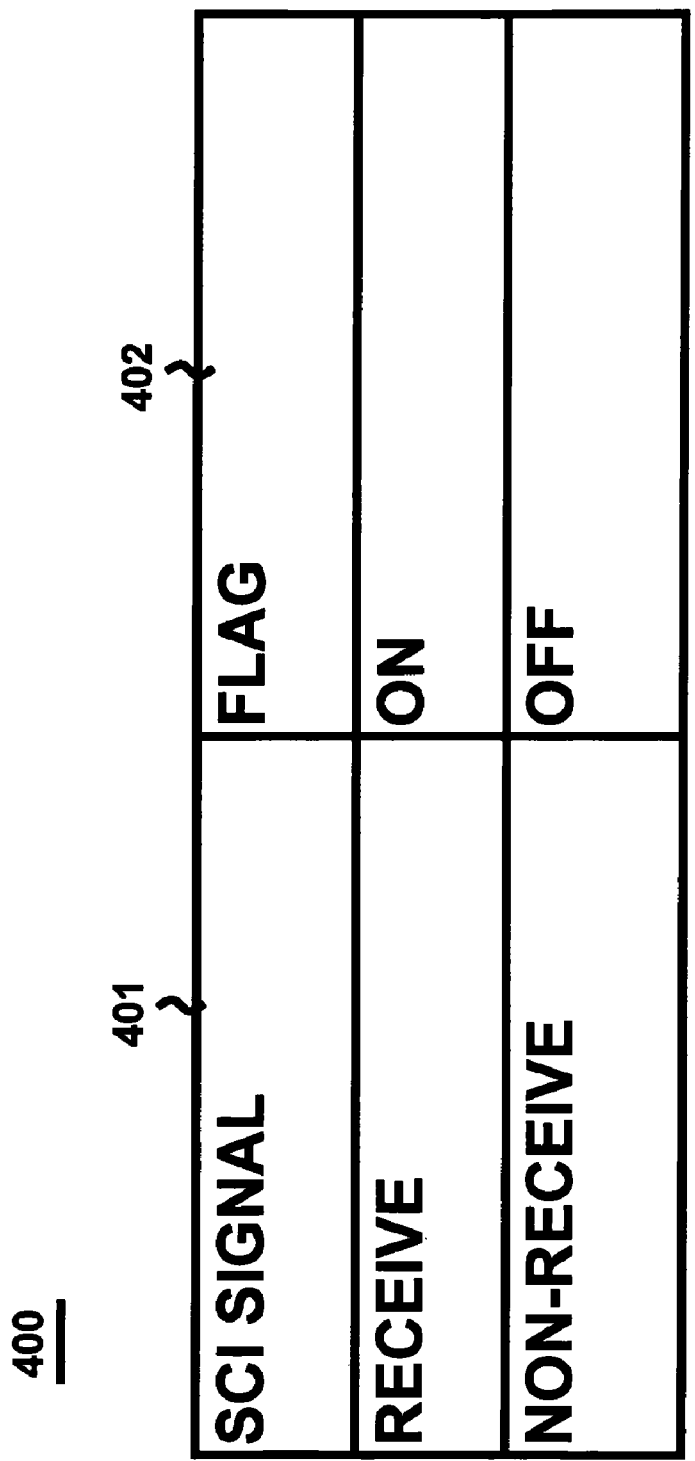
FIG. 4 is a diagram illustrating a status register according to an embodiment of the present invention.

FIG. 3 is a flowchart illustrating a password request process according to this embodiment.

The power supply unit 105 monitors which of the AC power supply 121 and the battery 106 supplies power to the information processing apparatus 100. In this embodiment, an example in which the information processing apparatus 100 is driven using power supplied from the AC power supply 121 will be described.

When a user starts up the information processing apparatus 100, the OS 201 requests the user to input a login password so as to perform password authentication (step S301). The OS 201 performs the authentication of a password that has been input by the user using the mouse 109 and the keyboard 110. If the input password is correct, the OS 201 allows the user to log in the OS 201. On the other hand, if the input password is incorrect, the OS 201 prohibits the user from logging in the OS 201. After inputting a correct password and logging in the OS 201, the user performs necessary processing in the OS 201 (step S302).

The AC power supply 121 is connected to the power supply unit 105 via the AC adapter 122, and supplies power so as to start the OS 201. If the AC adapter 122 is disconnected from the power supply unit 105, the power supply unit 105 transmits an SCI signal to the south bridge 104 and the OS 201 detects the SCI signal (step S303). The SCI signal is an interrupt request signal for interrupting the processing performed by the OS 201. Subsequently, the power supply unit 105 changes a power source from the AC power supply 121 to the battery 106, since power cannot be supplied from the AC power supply 121 to the information processing apparatus 100 via the AC adapter 122 disconnected from the power supply unit 105.

Upon receiving the SCI signal, the OS 201 calls the SCI handler included in the BIOS 202 (step S304). In the BIOS 202, the SCI handler checks whether the SCI signal, which has been received by the OS 201 from the power supply unit 105, is an signal representing that the AC adapter 122 has been disconnected from the power supply unit 105 or a signal representing that the AC adapter 122 has been connected to the power supply unit 105 (step S305). If the received SCI signal is the signal representing that the AC adapter 122 has been disconnected from the power supply unit 105, the BIOS 202 transmits the check result to the application 203 (step S306).

The application 203 requests the OS 201 to lock the information processing apparatus 100 and perform password authentication (step S307). Subsequently, the OS 201 requests the user to input a password for password authentication (step S308). The application 203 monitors the user's input of a password (step S309).

The application 203 determines whether a password input by the user is correct (step S310). If the input password is correct, the application 203 allows the user to continuously use the information processing apparatus 100. On the other hand, if the input password is incorrect, the application 203 requests the OS 201 to shut down the information processing apparatus 100 (step S312). Subsequently, the OS 201 shuts down the information processing apparatus 100 (step S313).

Second Embodiment

In this embodiment, the information processing apparatus 100 requests a user to input a password for password authentication when the AC adapter 122 is connected to the power supply unit 105.

FIG. 5 is a flowchart illustrating a password request process according to this embodiment.

The power supply unit 105 monitors which of the AC power supply 121 and the battery 106 supplies power to the information processing apparatus 100. In this embodiment, an example in which the information processing apparatus 100 is driven using power supplied from the battery 106 will be described.

When a user starts up the information processing apparatus 100, the OS 201 requests the user to input a login password so as to perform password authentication (step S501). The OS 201 performs the authentication of a password that has been input by the user using the mouse 109 and the keyboard 110. If the input password is correct, the OS 201 allows the user to log in the OS 201. On the other hand, if the input password is incorrect, the OS 201 prohibits the user from logging in the OS 201. After inputting a correct password and logging in the OS 201, the user performs necessary processing in the OS 201 (step S502).

If the AC adapter 122 is connected to the power supply unit 105 after the OS 201 has been driven using power supplied from the battery 106, the power supply unit 105 transmits an SCI signal to the south bridge 104 and the OS 201 detects the SCI signal (step S503). The SCI signal is an interrupt request signal for interrupting the processing performed by the OS 201. Subsequently, the power supply unit 105 changes a power source from the battery 106 to the AC power supply 121.

Upon receiving the SCI signal, the OS 201 calls the SCI handler included in the BIOS 202 (step S504). In the BIOS 202, the SCI handler checks whether the SCI signal, which has been received by the OS 201 from the power supply unit 105, is an signal representing that the AC adapter 122 has, been disconnected from the power supply unit 105 or a signal representing that the AC adapter 122 has been connected to the power supply unit 105 (step S505). If the received SCI signal is the signal representing that the AC adapter 122 has been connected to the power supply unit 105, the BIOS 202 transmits the check result to the application 203 (step S506).

The application 203 requests the OS 201 to lock the information processing apparatus 100 and perform password authentication (step S507). Subsequently, the OS 201 requests the user to input a password for password authentication (step S508). The application 203 monitors the user's input of a password (step S509).

The application 203 determines whether a password input by the user is correct (step S510). If the input password is correct, the application 203 allows the user to continuously use the information processing apparatus 100. On the other hand, if the input password is incorrect, the application 203 requests the OS 201 to shut down the information processing apparatus 100 (step S512). Subsequently, the OS 201 shuts down the information processing apparatus 100 (step S513).

Thus, the information processing apparatus 100 can be locked for security, even if it is stolen. Accordingly, the leakage of data stored in the information processing apparatus 100 can be prevented.

The technical ideas derived from the above-described embodiments of an electronic apparatus will be enumerated below as appendices in the form of claims. The technical ideas according to the present invention may be understood at various levels ranging from a generic concept to a more specific concept. Accordingly, the present invention is not limited to the following appendices.

What is claimed is:

1. An electronic apparatus powered by one of a battery and an external power supply, the electronic apparatus comprising:
   a power supply unit that provides an interior of the electronic apparatus with electric power from one of the battery and the external power supply alternatively, the power supply unit generating a switching signal which is output based on switching supply of the electric power between the battery and the external power supply; and
   a controller that requests user authentication when supply of the electric power to the interior of the electric apparatus is switched between the battery and the external power supply, and shutting down the electronic apparatus when the user authentication is unsuccessful to authenticate the switching signal.

2. The electronic apparatus according to claim 1, wherein the switching signal is indicative of switching from the external power supply to the battery.

3. The electronic apparatus according to claim 1, wherein the switching signal is indicative of both stopping the power supply from the external power supply and starting the power supply from the battery.

4. The electronic apparatus according to claim 1, wherein the switching signal is indicative of switching from the battery to the external power supply.

5. The electronic apparatus according to claim 1, wherein the switching signal is indicative of both starting the power supply from the external power supply and stopping the power supply from the battery.

6. A method for preventing unauthorized access to an electronic apparatus comprising:
   providing an interior of the electronic apparatus with electric power from one of a battery and an external power supply alternatively;
   generating a switching signal which is output based on switching supply of the electric power between the battery and the external power supply; and
   requesting user authentication when supply of the electric power to the interior of the electric apparatus is switched between the battery and the external power supply, and shutting down the electronic apparatus when the user authentication is unsuccessful to authenticate the switching signal.

7. The method according to claim 6, wherein the switching signal is indicative of switching from the external power supply to the battery.

8. The method according to claim 6, wherein the switching signal is indicative of both stopping the power supply from the external power supply and starting the power supply from the battery.

9. The method according to claim 6, wherein the switching signal is indicative of switching from the battery to the external power supply.

10. The method according to claim 6, wherein the switching signal is indicative of both starting the power supply from the external power supply and stopping the power supply from the battery.

* * * * *